(12) United States Patent
Hahn

(10) Patent No.: US 6,928,682 B1
(45) Date of Patent: Aug. 16, 2005

(54) ICE TOOL

(76) Inventor: Gary Hahn, N1072 Lone Pine Rd., Adell, WI (US) 53001

(*) Notice: Subject to any disclaimer, the term of this patent is extended or adjusted under 35 U.S.C. 154(b) by 0 days.

(21) Appl. No.: 10/417,434

(22) Filed: Apr. 18, 2003

(51) Int. Cl.[7] .............................................. B25F 1/00
(52) U.S. Cl. ............................................. 7/106; 7/158
(58) Field of Search ................... 7/106, 158; 81/488, 81/489

(56) References Cited

U.S. PATENT DOCUMENTS

| | | | | |
|---|---|---|---|---|
| 1,435,061 | A | * 11/1922 | Halsey | 294/51 |
| 3,568,657 | A | * 3/1971 | Gue | 125/40 |
| 5,005,286 | A | * 4/1991 | Purcell | 30/1 |
| 5,070,564 | A | * 12/1991 | Fey | 7/170 |
| 5,085,281 | A | * 2/1992 | Selly | 173/91 |
| 5,109,739 | A | * 5/1992 | Hull et al. | 81/463 |
| 5,428,853 | A | * 7/1995 | Menke et al. | 7/138 |
| 5,699,864 | A | * 12/1997 | Dvorak et al. | 173/91 |
| 5,768,785 | A | 6/1998 | Pessin | |
| 6,109,365 | A | 8/2000 | Lamoureux et al. | |
| 6,308,934 | B1 | * 10/2001 | Gallo | 254/25 |
| 6,357,067 | B1 | * 3/2002 | Jones | 7/116 |
| 6,406,388 | B1 | * 6/2002 | Davis et al. | 473/538 |

OTHER PUBLICATIONS

Pages printed from www.jiffy-on-ice.com regarding Chipper-Dipper made by Feldmann Engineering and Manufacturing Co., Inc.

* cited by examiner

*Primary Examiner*—David B. Thomas
(74) *Attorney, Agent, or Firm*—Nicholas A. Brannen

(57) ABSTRACT

The present invention has a shaft with a chisel and a ladle at opposed ends. Two stops are welded to the shaft, and a slide assembly is located between the stops. A first handle is between the chisel and the first stop, and a second handle is between the ladle and the second stop. The slide assembly strikes the first stop to make the chisel break through the ice. The ladle is used to scoop out any pieces of ice that are in the hole. A rubber material is on the slide assembly and on the second handle to prevent the user's gloves from freezing thereon. The chisel can be driven into the frozen surface, but not through the frozen surface, to form an anchor. Removal of the anchor is accomplished by striking the slide assembly against the second stop.

21 Claims, 4 Drawing Sheets

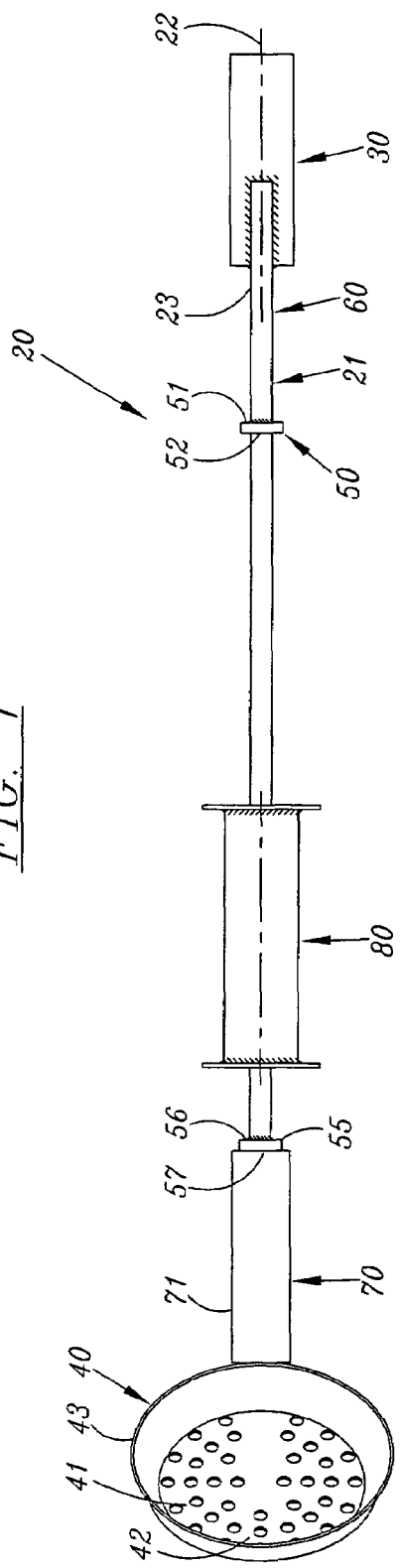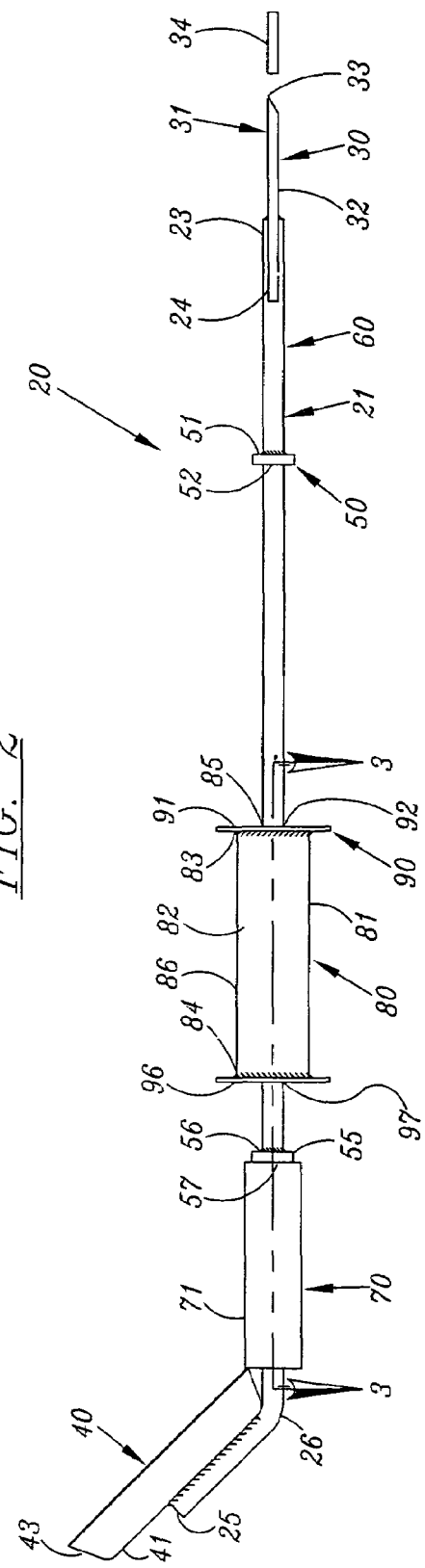

ICE TOOL

BACKGROUND OF THE INVENTION

1. Field of the Invention

The present invention relates generally to a tool, and more particularly to a tool comprising a shaft with a chisel and a ladle on opposed ends of the shaft, and a slide assembly therebetween for causing the chisel to impact a frozen surface to create a hole through the frozen surface.

2. Description of the Related Art

People desiring to ice fish need many tools, such as a tool for creating a hole through the ice, and tools for catching fish. Not having the proper tools detracts from the ability to ice fish, or at least detracts from the efficiency with which a person can set up and actively engage in the activity of ice fishing.

People commonly use ice augers to create an ice fishing hole. Many companies manufacture and sell ice augers, and they are well understood in the art. Ice augers perform well for creating a hole through ice, even when the ice has a thickness of several feet or more. However, there are limits to the usefulness of ice augers. For motorized ice augers in particular, it may be impractical to transport the ice auger to the desired fishing location, especially for people who walk to their fishing locations. Also, sometimes the ice may not be thick enough to justify the labor required to transport the ice auger to the desired fishing location. Further, ice augers are not suited for maintaining ice fishing holes, especially when a tip up is being used. For these and other reasons, other tools have been developed.

One such tool is sold by Feldmann Engineering and Manufacturing Co., Inc, of Wisconsin under the name "Chipper-Dipper." That product has a chisel and a strainer, which are separated by a handle. The chisel may be practical and effective for chiseling through ice that is only minimally thick, but problems can occur when using this tool to try to chisel through ice that is over about an inch thick. This tool can be undesirably inaccurate, because it can be difficult to repeatedly strike the chisel of this tool in the same location when trying to chisel through the ice. This is because the chisel is moved relative to the ice surface between successive strikes. Further, people sometimes use a hammer, mallet or the like to hit the strainer end of the Chipper-Dipper to try and make the chisel penetrate the ice. Doing this not only can damage the Chipper-Dipper, but also can be dangerous to the user. Also, the handle is flimsy, which can further frustrate attempts to use the Chipper-Dipper to chip through a frozen surface.

Another type of tool that has been developed is commonly referred to as a "spud bar." Generally speaking, a spud bar is comprised of a bar measuring several feet in length and having a chisel at one end. A relatively large amount of momentum can be generated with the spud bar. While the spud bar is far more effective at breaking through thick ice than a Chipper-Dipper, there are undesirable aspects associated with the use of a spud bar. For example, as with the Chipper-Dipper, it can be difficult to repeatedly strike the spud bar chisel in the same location, as the entire spud bar is raised and lowered between successive strikes. The relatively large size of the spud bar can further contribute to this inaccuracy. Because of the inaccuracy, use of a spud bar can potentially damage a tip up or a line spool that are located in the hole. Hence, this tool is not well suited for maintaining an ice fishing hole, especially when a tip up is in use at the same time that the person is maintaining the hole.

There are in existence many tools that utilize a slide hammer, or slide assembly. Examples of these types of tools are shown in U.S. Pat. No. 5,768,785 to Pessin and U.S. Pat. No. 6,109,365 to Lamoureux et al. While the tools shown in these patents may perform well for their respective intended purposes, those tools cannot be used to create ice fishing holes. Further, there is no teaching or suggestions in either of those respective patents that the tools shown in those patents could be or are intended to be used to create ice fishing holes. Also, nothing is shown in either of these patents that is capable of scooping ice pieces out of an ice fishing hole.

A further problem common for many ice fishers is that wind can blow away items such as a portable ice shanty or a sled loaded with gear before the ice fishers have time to properly set the shanty up or secure the sled. None of the tools described above are capable of solving this problem. Specifically, none of the tools described above are designed for creating a removeable ice anchor. Such an anchor would allow the fisher to prevent the wind from blowing the anchored items across a frozen surface, especially during glare ice conditions.

Hence, a need exists for an easily transportable and self contained tool for creating and maintaining an ice fishing hole, as well as for being an anchor to a frozen surface.

SUMMARY OF THE INVENTION

The present invention relates to an ice tool used to create and maintain an ice fishing hole. The ice tool of the present invention can also be used as an anchor.

This is accomplished by providing a tool having a shaft. A chisel and a ladle are at opposed ends of the shaft. Two stops can be welded to the shaft, and a slide assembly is located between the stops. A first handle is between and can include the chisel and the first stop, and a second handle is between the ladle and the second stop.

In accordance with one aspect of the present invention, after positioning the chisel on the ice, the user can repeatedly strike the slide assembly against the first stop to make the chisel impact and break through the ice. Because the user does not have to lift the entire tool between successive impacts, the chisel precisely remains in its intended position. This precision reduces the risk of inadvertent damage to a tip up or spool that may be in a hole when using the tool of the present invention. After a hole is created or maintained, the ladle can then be used to scoop out any pieces of ice that remain in the ice fishing hole.

In accordance with another aspect of the present invention, a rubber material can be on the slide assembly and on the second handle to prevent the user's gloves from freezing onto those respective portions of the tool.

In accordance with yet another aspect of the present invention, the chisel of the ice tool can be driven into the frozen surface, but not through the frozen surface, to form a removeable anchor. To remove the anchor from the frozen surface, the user simply strikes the slide assembly against the second stop as many times as required to dislodge the chisel from the frozen surface.

According to another aspect of the present invention, the ice tool is self contained and easily transportable. These features are advantageous to people who desire to only take the tools with them that they can carry, and to people that have only limited room on or in any vehicle or sled that they take with them to carry their ice fishing tools.

Other advantages, benefits, and features of the present invention will become apparent to those skilled in the art upon reading the detailed description of the invention and studying the drawings.

BRIEF DESCRIPTION OF THE DRAWINGS

FIG. 1 is a front view of the ice tool of the present invention.

FIG. 2 is a side view of the ice tool of the present invention shown in FIG. 1.

DETAILED DESCRIPTION OF THE PREFERRED EMBODIMENTS

Figure 3:
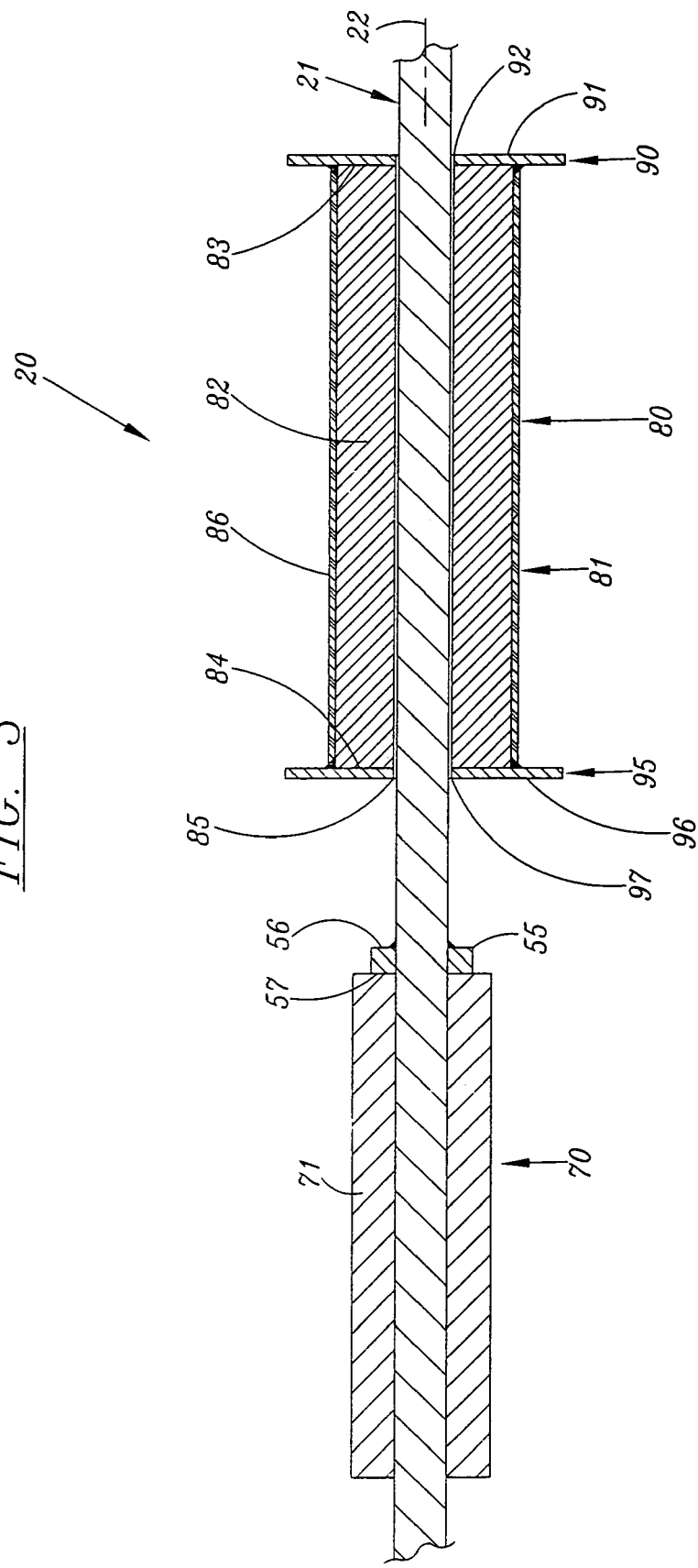
FIG. 3 is a cross-sectional view taken along line 3—3 in FIG. 2.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

One surface on which the present invention can be used is an ice surface 5. The ice surface 5 can be any of thickness. However, in the preferred environment, the present invention is most useful with ice surfaces 5 having a thickness of about 4 inches or less. People 10 desiring to ice fish must first create a hole 6 through the ice surface 5. People 10 therefore grip the present invention with their hands 11 and then create the hole 6 through the ice surface 5. During the process of creating the hole 6, many ice pieces 7 are produced, which must be removed from the hole 6.

The present invention is preferably has some components made of steel. However, other strong materials can be used without departing from the broad aspects of the present invention. Some other components are preferably made of neoprene rubber. However, other materials can be used that are also resistant to having objects freeze to them. Throughout the specification, preferred dimensions are provided. However, it is contemplated that other dimensions could be used without departing from the broad aspects of the present invention.

In accordance with the present invention, an ice tool 20 is provided, as shown in FIGS. 1–8. The ice tool has a shaft 21 having a longitudinal axis 22. The shaft 21 has a first end 23 with a slit 24 therethrough. The shaft 21 has a second end 25 as well. The shaft 21 has a bend 26 near the second end 25 such that the second end is not in alignment with the longitudinal axis 22.

In the preferred embodiment, the shaft 21 is 0.50 inch round steel having an overall length of 36 inches. The bend 26 is preferably located about three inches from the second end 26 of the shaft, and the bend 26 preferably bends the second end approximately at an angle of 45 degrees from alignment with the longitudinal axis 22.

A chisel 30 is provided having a first side 31 and a second side 32, as best shown in FIG. 2. The first and second sides 31 and 32 end at a tip 33. When not in use, a cover 34 is provided for covering the chisel 30 to prevent inadvertent contact between the chisel 30 and an object. In the preferred embodiment, the chisel 30 is made from a 0.25 inch steel slat. The chisel 30 further has a total length of approximately between 3 and 5 inches, and has a width of approximately 1.5 inches. The tip 33 preferably converges to a chiseling edge at an interior angle of approximately 30 degrees.

The chisel 30 is connected to the first end 23 of the shaft 21. More particularly, the chisel 30 fits within the slit 24 at the first end 23 of the shaft 21 and is preferably welded in place.

A ladle 40 is also provided having a plate 41, as shown in FIG. 1. Plate 41 is preferably generally round and is made from 16 gauge sheet steel and has a diameter of about 4.8 inches. There are preferably about thirty-nine holes 42 through the plate 41. A rim 43 is provided and is connected to the periphery of the plate 41. The rim 43 has a height of about 0.9 inches. The ladle 40 has an overall diameter of about 6.1 inches.

The ladle 40 is connected to the second end 25 of the shaft 21. Stated more particularly, the ladle 40 is preferably welded to the shaft second end 25. As can be seen in FIG. 2, there are no holes 42 through the plate 41 where the ladle 40 is welded to the shaft second end 25. The ladle 40 lies in a plane angled approximately 45 degrees out of alignment with the shaft longitudinal axis 21.

A first stop 50 is provided, as shown in FIGS. 1 and 2. The first stop 50 is preferably comprised of a 1 inch diameter steel round stock. The stop 50 has a first surface 51 and an opposed second surface 52. A hole is through the stop 50 between the first and second surfaces 51 and 52. That hole has a diameter of approximately 0.51 inches, which is a small amount larger than the diameter of the shaft 21. The stop 50 is preferably welded in place. The weld is preferably located on the first side 51 of the stop 50.

A second stop 55 is also provided, as shown in FIGS. 1 and 2. The second stop 55 is preferably comprised of a 1 inch diameter steel round stock. The stop 55 has a first surface 56 and an opposed second surface 57. A hole is through the stop 55 between the surfaces 56 and 57. That hole has a diameter of approximately 0.51 inches, which is a small amount larger than the diameter of the shaft 21. The stop 55 is preferably welded in place. The weld is preferably located on the first side 56 of the stop 55.

A first handle 60 is provided, as shown in FIG. 1, and comprises the segment of the shaft 21 between the chisel 30 and first stop 50. The first handle 60 is preferably about 5.0 inches in length. In carrying out this aspect of the present invention, the handle 60 can also comprise the chisel 30. The user can then grip the handle 60 by gripping both the particular segment of the shaft 21 and the chisel 30 with their hand 11.

A second handle 70 is also provided, as shown in FIGS. 1–3. The second handle 70 comprises a piece of neoprene rubber 71. The neoprene rubber preferably has a diameter of about 1.375 inches, and is preferably about 5.0 inches long. Handle 70 is located between the ladle 40 and the second stop 55. As an alternative embodiment (not shown), the handle could consist of the segment of shaft 21 between the ladle 40 and second stop 55, and not comprise a piece of neoprene rubber or any other material that is resistant to having objects freeze to it.

In accordance with another aspect of the present invention, shown in FIGS. 1–3, a slide assembly 80 is provided. The slide assembly 80 comprises a grip 81 made from a stock 82. The stock 82 has a first end 83 and a second end 84. The stock 82 is preferably a 1.75 diameter steel round stock having a longitudinal length of approximately 6.0 inches. A bore 85 is through the stock 82 in a direction parallel with the longitudinal length of the stock 82. Bore 85 preferably has a diameter of approximately 0.56 inches. A material 86 is preferably on the grip 81 to prevent objects, such as a user's glove, from freezing to the grip 81. One preferred material 86 is neoprene rubber. In an alternative embodiment (not shown), no such material is provided for preventing objects from freezing to the grip 81.

A first flange 90 is on the first end 83 of the grip 81. The flange 90 has an outer surface 91 and a hole 92 through the flange 90. The hole 92 is alignable with the bore 85, and has the same diameter as bore 85. The flange 90 is preferably welded to grip 81.

Similarly, a second flange 95 is on the second end 84 of the grip 81. The flange 95 has an outer surface 96 and a hole 97 through the flange 95. Hole 97 is alignable with the bore 85, and it has the same diameter as bore 85. The flange 95 is preferably welded to grip 81.

The slide assembly 80 is preferably slideably connected to the shaft 21 between the first stop 50 and the second stop 55. The stops 50 and 55 are preferably located about 12.0 inches apart. Given that the slide assembly 80 is referably about 6.0 inches long, the slide assembly 80 preferably has about 6.0 inches to slide with respect to the remainder of the tool 20. The slide assembly 80 is slideable in directions 101 and 102, which are generally parallel to the longitudianal axis 22 of the shaft 21. By sliding the slide assembly 80 in the first direction 101, the outer surface 91 of the first flange 90 is strikeable against the second surface 52 of stop 50. By sliding the slide assembly 80 in the second direction, the outer surface 96 of the second flange 95 is strikeable against the first surface 56 of the second stop 55.

To assemble to ice tool 20 from its individual components, the first step is to make the bend 26 in the shaft about three inches from the second end 25 of the shaft 21. The ladle 40 is then welded to the second end 25 of the shaft 21. The neoprene rubber 71 of the second handle 70 is then placed on the first end 23 of the shaft and slid along the shaft until it abuts the rim 43 of the ladle 40. The second stop 55 is then placed on the first end 23 of the shaft and slid along the shaft 21 until the second surface abuts the second handle 70. The second stop 55 is then welded in place. The weld is preferably on the first side surface 56 of the second stop 55, so that the weld will not interfere with or damage the second handle 70 when completing the weld. The slide assembly 80 is the slid onto the shaft 21. Next, the first stop is slid onto the shaft 21 and welded in place approximately 7.0 inches from the first end 23 of the shaft 21. The weld is preferably located at the first side surface 51 of the first stop 50. In this regard, the weld is located opposite of the surface 52 that the slide assembly 80 strikes. This is done to maximize the efficiency with which momentum is transferred from the slide assembly 80 ultimately to the chisel 30. Lastly, the chisel 30 is slid into the slit 24 at the first end 23 of the shaft 21 and welded in place.

Figure 4:
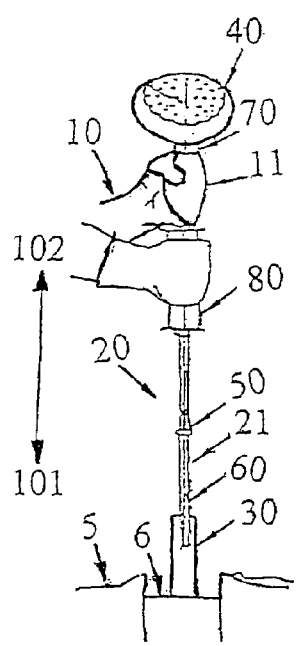
FIG. 4 is a side view of a person gripping the tool of the present invention and holding the slide assembly in position against the first stop.
Figure 5:
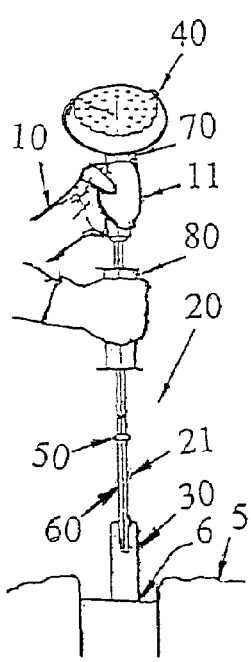
FIG. 5 is similar to FIG. 4, but shows the slide assembly intermediate between the first and second stops.
Figure 6:
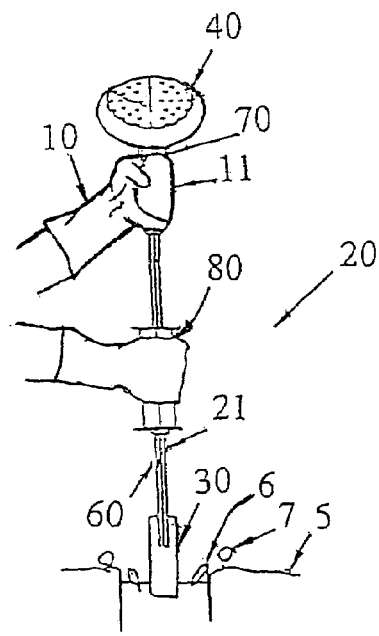
FIG. 6 is similar to FIGS. 4 and 5, but shows the slide assembly striking against the second stop, causing the chisel to penetrate the ice.
Figure 7:
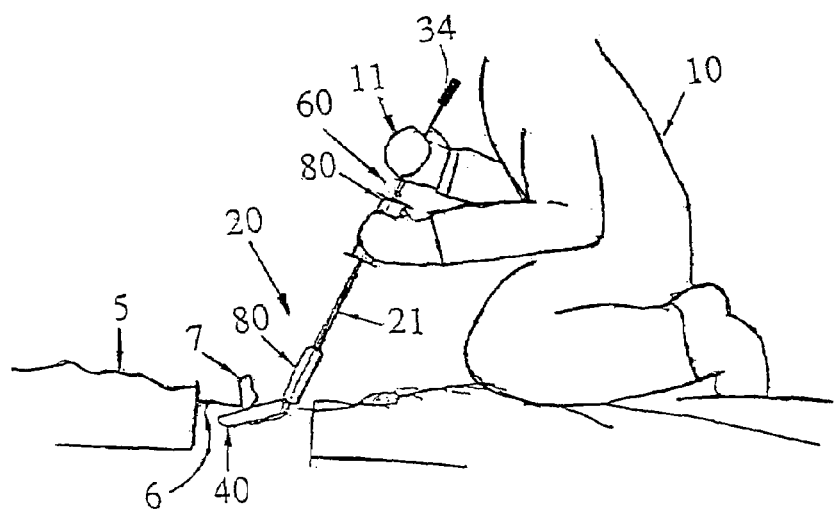
FIG. 7 is a view showing a person using the ladle to scoop pieces of ice from a hole through the ice.

Turning now to the use of the present invention, the ice tool 20 can be used to create a hole 6 through a frozen surface 5, as shown in FIGS. 4–6, and also to maintain the hole 6 as necessary depending on the weather and fishing conditions. The chisel 30 is first put on the surface 5 at a desired position. Then the user grips the second handle 70 with one hand and the slide assembly 80 with the other hand. The user manipulates the slide assembly 80 with respect to the chisel 30 to repeatedly strike the slide assembly 80 against the first stop 50, causing the chisel 30 to repeatedly impact the frozen surface 5, and drive the chisel 30 through the surface 5. In this regard, the user can develop a large amount of momentum in the slide assembly 80 which gets transferred to the tip 33 of the chisel 30 upon the impact of the slide assembly 80 and the first stop 50. These steps are repeated as many times as necessary until a hole of sufficient and desired size is created. The fishing hole 6 is maintained in the same manner.

After the hole 6 is created, the user 10 may need to remove the pieces of ice 7 from the hole 6. To accomplish this, the user 10 can grip the first handle 60 with one hand and can optionally grip the slide assembly 80 with the other hand, as shown in FIG. 6. The user then simply scoops out the ice pieces 7 while water drains through the holes 42 through the plate 41. When performing this process the user can also grip the chisel 30 to provide rotational stability. This is done to prevent the tool 20 from rotating due to the weight of the ice pieces 7 held in the ladle 40. It is preferred that the cover 34 be on the chisel 30 when using the tool in this manner, so that the tip 33 of the chisel 30 is prevented from contacting and causing injury to a user, or from contacting and damaging the user's cloths.

Figure 8:
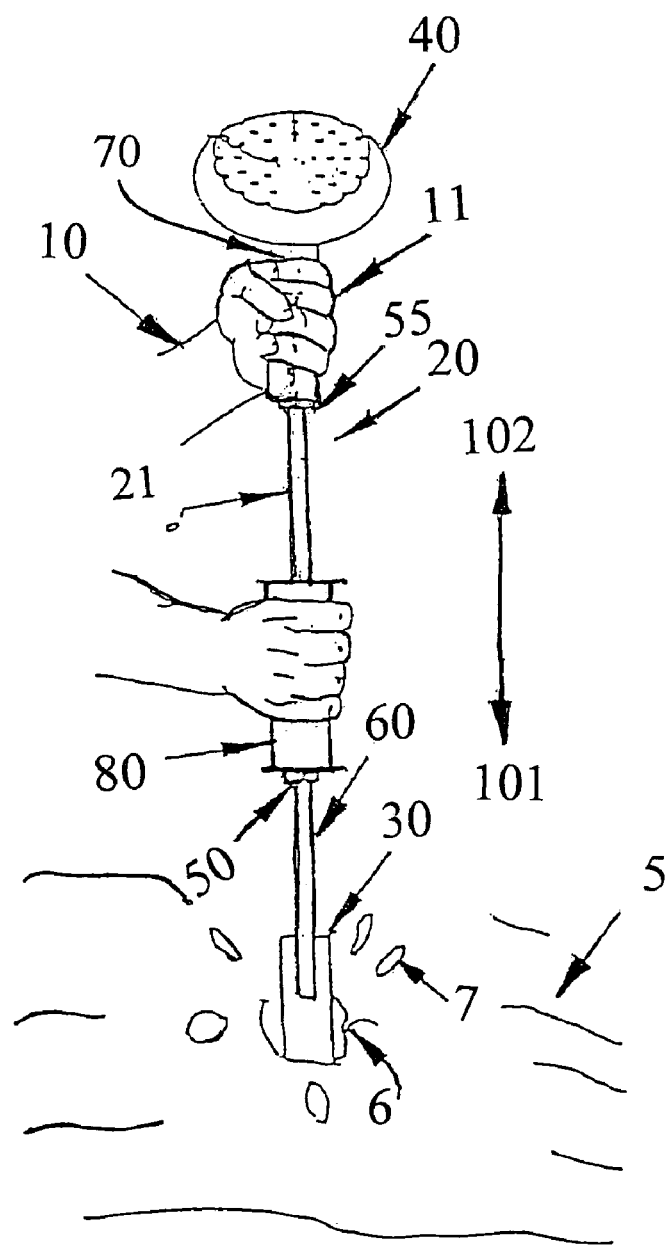
FIG. 8 is a perspective view of a person driving the present invention into the ice to form a removeable anchor in the ice.

The present invention also proves quite useful for yet another purpose as shown in FIG. 8, which is to create a removeable anchor in the ice. To accomplish this, the tool 20 is first placed in a desired location. Then, the slide assembly 80 is manipulated so that it strikes the first stop 50 as often as necessary to drive the chisel 30 part way through the ice surface 5. In this regard, the hole created by the tool 20 has a small diameter, such that when the tool 20 is inserted in the tool, a force generally perpendicular to the tool longitudinal axis 22 does not remove the tool 20 from the anchoring hole.

In some circumstances, the tool 20, and the chisel 30 in particular, has a tendency to become lodged within the frozen surface. Yet, the tool 20 can be removed from the frozen surface by striking the slide assembly 80 against the second stop 55 as often as necessary to dislodge the chisel 30 from the frozen surface. The ladle 40 is an optional feature of the present invention when carrying out this aspect of the present invention.

Thus, it is apparent that there has been provided, in accordance with the present invention, an ice tool that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A tool comprising:
   a shaft having a first shaft end and a second shaft end, and having a longitudinal axis;
   a chisel at said first shaft end that is locatable at a selected location on a surface;
   a ladle at said second shaft end; and
   a slide assembly between said chisel and said ladle that is slideable with respect to said shaft in directions generally parallel to said longitudinal axis of said shaft, wherein manipulation of said slide assembly causes said chisel to impact the surface at the selected location.

2. The tool of claim 1 wherein said ladle is welded to said second shaft end.

3. The tool of claim 1 wherein said ladle comprises:
a plate having a plurality of holes for allowing the liquid to pass therethrough and having a periphery; and
a rim around said periphery of said plate.

4. The tool of claim 1 wherein said shaft is comprised of steel.

5. The tool of claim 1 wherein said shaft is generally circular.

6. The tool of claim 1 wherein:
said tool further comprises a first stop connected to said shaft;
said slide assembly comprises a slide assembly first end; and
said slide assembly first end is strikeable against said first stop to transfer momentum from said slide assembly to said chisel.

7. The tool of claim 6 wherein:
A. said tool comprises a second stop connected to said shaft; and
B. said slide assembly is slideably connected to said shaft intermediate said first stop and said second stop.

8. The tool of claim 7 further comprising a handle between said second stop and said ladle, wherein said handle comprises neoprene rubber.

9. The tool of claim 1 wherein said slide assembly comprises a slide assembly first end, a slide assembly second end, and a slide assembly grip therebetween.

10. The tool of claim 9 wherein said slide assembly further comprises a rubber material is on said slide assembly grip.

11. A tool for creating an ice fishing hole through a frozen surface comprising:
a shaft having a first shaft end and a second shaft end;
a chisel on said first shaft end; a ladle connected to said second shaft end; and
a slide assembly slideably connected to said shaft and located intermediate between said first shaft end and said second shaft end, said slide assembly comprising a stock with a grip wherein a rubber coating is on said grip to prevent an object from being freezingly connected to said slide assembly.

12. The tool of claim 11 further comprising a first stop and a second stop rigidly connected to said shaft.

13. The tool of claim 12 further comprising a handle on said shaft located between said ladle and said second stop.

14. The tool of claim 13 wherein said rubber coating is connected to said grip.

15. The tool of claim 12 wherein said slide assembly is strikeable against said first stop to force said chisel in a first direction.

16. The tool of claim 12 wherein said slide assembly is strikeable against said second stop to force said chisel in a second direction.

17. A method of creating an ice fishing hole comprising the steps of:
providing a frozen surface through which a person can ice fish;
providing a tool with a shaft having a first shaft end and a second shaft end, and having a chisel at the first shaft end, a ladle at the second shaft end and a slide assembly intermediate between the chisel and the second shaft end;
positioning the chisel in a predetermined position on the frozen surface;
manipulating the slide assembly such that momentum is transferred from the slide assembly to the chisel to break the frozen surface and create an ice fishing hole; and
using the ladle to scoop pieces of ice from the hole through the frozen surface.

18. The method of claim 17 wherein:
the step of providing a tool comprises the step of providing a first stop connected to the shaft; and
the step of manipulating the slide assembly comprises the step of striking the slide assembly against the first stop.

19. The method of claim 17 wherein the step of manipulating the slide assembly is repeated a plurality of times to break through the frozen surface.

20. The method of claim 17 further comprising the steps of:
providing a tip up through the ice fishing hole; and
using the tool to maintain the ice fishing hole without breaking the tip up.

21. A method of creating an ice fishing hole comprising the steps of:
providing a frozen surface through which a person can ice fish;
providing a tool with a shaft having a first shaft end and a second shaft end, and having a chisel at the first shaft end, a ladle at the second shaft end, and a slide assembly intermediate between the chisel and the second shaft end, the slide assembly having a grip coated with rubber to prevent an object from becoming freezingly connected to the grip;
positioning the chisel in a predetermined position on the frozen surface; and
manipulating the slide assembly such that momentum is transferred from the slide assembly to the chisel to break the frozen surface and create an ice fishing hole.

* * * * *